United States Patent
Richard et al.

(10) Patent No.: US 9,566,970 B2
(45) Date of Patent: Feb. 14, 2017

(54) ELECTROMECHANICAL ACTUATOR FOR A BRAKE

(71) Applicant: MESSIER-BUGATTI-DOWTY, Velizy Villacoublay (FR)

(72) Inventors: Nathanael Richard, Velizy-Villacoublay (FR); Eric Evenor, Velizy-Villacoublay (FR); Franck Selles, Velizy-Villacoublay (FR)

(73) Assignee: MESSIER-BUGATTI-DOWTY, Velizy Villacoublay (FR)

(*) Notice: Subject to any disclaimer, the term of this patent is extended or adjusted under 35 U.S.C. 154(b) by 0 days.

(21) Appl. No.: 14/192,036

(22) Filed: Feb. 27, 2014

(65) Prior Publication Data

US 2014/0262641 A1 Sep. 18, 2014

(30) Foreign Application Priority Data

Mar. 12, 2013 (FR) ...................... 13 52209

(51) Int. Cl.
*B60T 13/74* (2006.01)
*H02K 7/06* (2006.01)
(Continued)

(52) U.S. Cl.
CPC ............ *B60T 13/746* (2013.01); *F16D 65/16* (2013.01); *F16D 65/18* (2013.01); *H02K 7/06* (2013.01);
(Continued)

(58) Field of Classification Search
CPC .... F16D 65/28; F16D 65/16; F16D 2066/005; F16D 2121/24; H02K 49/06; H02K 49/10; H02K 11/0078; B60T 13/746
(Continued)

(56) References Cited

U.S. PATENT DOCUMENTS 6,000,507 A * 12/1999 Bohm et al. .................. 188/158
6,230,854 B1 * 5/2001 Schwarz et al. ............. 188/156
(Continued)

FOREIGN PATENT DOCUMENTS

DE 10 2007 037 447 A1 2/2009
EP 0 936 373 A2 8/1999
(Continued)

OTHER PUBLICATIONS

ProQuest translation, JP 2006-213080 A, Yokoyama et al.*
French Search Report of Application No. 13 52209 dated Feb. 6, 2014.

*Primary Examiner* — Thomas J Williams
(74) *Attorney, Agent, or Firm* — Sughrue Mion, PLLC

(57) ABSTRACT

An electromechanical actuator for a vehicle brake, the actuator comprising first and second portions 8 and 9 that are separable. The first portion 8 includes an electric motor 5 and connection structure 15 for connecting the actuator to an external control structure 4. The second portion 9 including a slidable pusher 6, the second portion 9 also including measurement structure 21. The first portion 8 includes a first antenna 14 connected to the connection structure 15, and the second portion 9 includes a second antenna 22 connected to the measurement structure 21, the two antennas 14, 22 being arranged to be electromagnetically coupled together when the first portion 8 and the second portion 9 are coupled together, so as to enable electrical signals to be transferred between the measurement structure 21 and the connection structure 15.

6 Claims, 1 Drawing Sheet

(51) Int. Cl.
  *H02K 7/116* (2006.01)
  *F16D 65/16* (2006.01)
  *F16D 65/18* (2006.01)
  B64C 25/44 (2006.01)
  F16D 66/00 (2006.01)
  F16D 121/24 (2012.01)

(52) U.S. Cl.
  CPC ............... *H02K 7/116* (2013.01); *H02K 11/24* (2016.01); *H02K 11/35* (2016.01); *B64C 25/44* (2013.01); *F16D 2066/005* (2013.01); *F16D 2121/24* (2013.01)

(58) Field of Classification Search
  USPC .................. 188/72.7, 72.8, 158, 161, 162
  See application file for complete search history.

(56) References Cited

U.S. PATENT DOCUMENTS

| | | | |
|---|---|---|---|
| 2003/0083797 A1* | 5/2003 | Yokoyama et al. | 303/20 |
| 2005/0251306 A1 | 11/2005 | Gowan et al. | |
| 2006/0180413 A1* | 8/2006 | Halasy-Wimmer et al. | 188/158 |
| 2009/0320614 A1 | 12/2009 | Cook et al. | |
| 2012/0267961 A1* | 10/2012 | Endo et al. | 307/104 |

FOREIGN PATENT DOCUMENTS

| | | | |
|---|---|---|---|
| JP | 2006213080 A * | 8/2006 | |
| WO | 2005/001303 A2 | 1/2005 | |
| WO | WO 2006045724 A1 * | 5/2006 | |

* cited by examiner

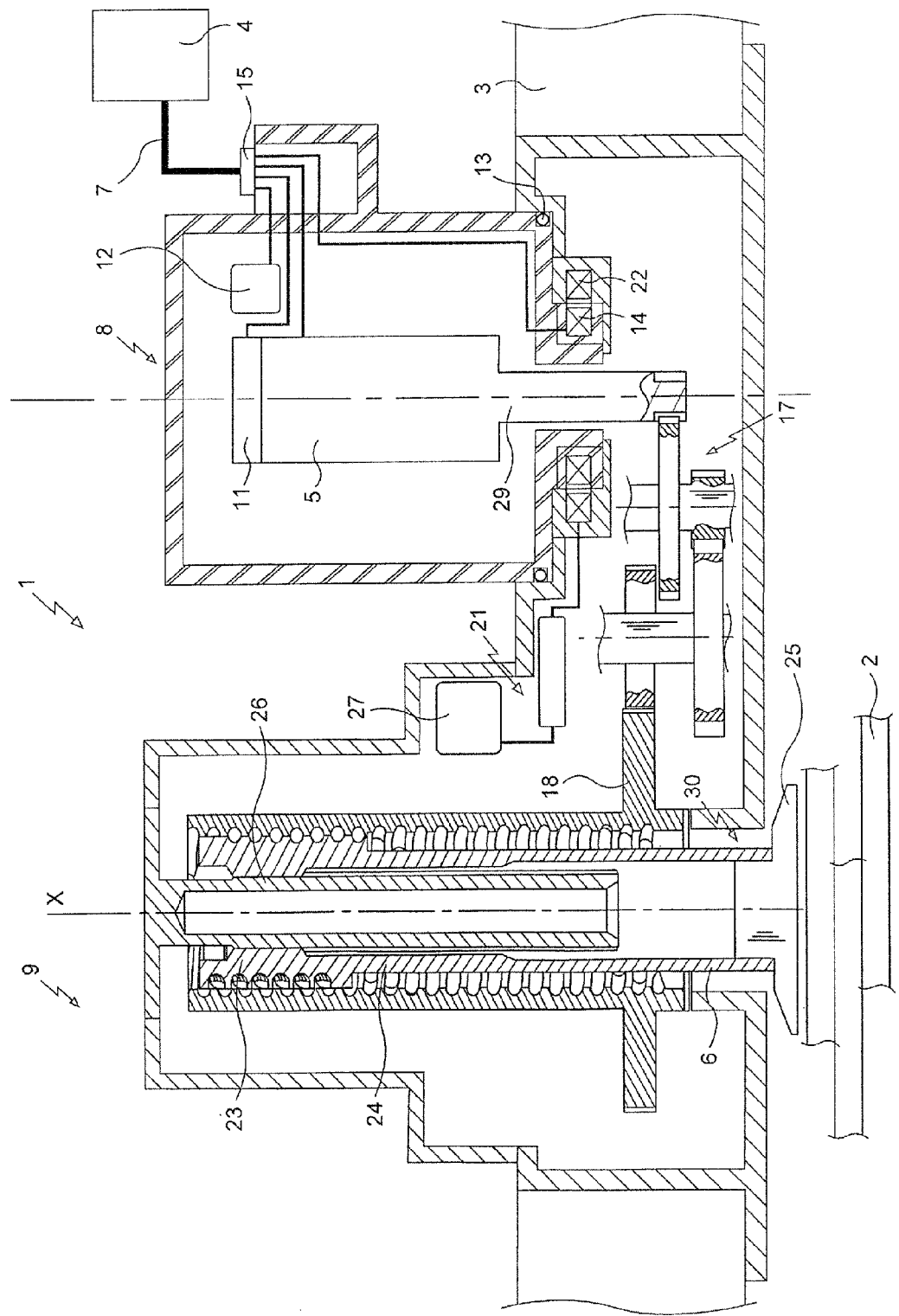

ELECTROMECHANICAL ACTUATOR FOR A BRAKE

The invention relates to an electromechanical actuator for a vehicle brake, the actuator comprising two portions that are separable.

BACKGROUND OF THE INVENTION

In an electrical braking system for an aircraft, each braked wheel is provided with a brake having friction members, generally a stack of carbon disks stacked around a torsion tube, and electromechanical actuators carried by an actuator carrier and controlled to apply a braking force on the friction members in order to exert a braking torque on the wheel tending to slow the aircraft down.

Each electromechanical actuator is electrically powered and controlled by external control means. An actuator generally includes a pusher, an electric motor adapted to move the pusher in register with friction members, a blocking member for blocking the pusher in position, and sensors associated with the motor (position sensor, etc.) or with the pusher (force sensor, thermocouple, etc.). In order to control the electric motor, in order to actuate the blocking means, and in order to acquire the measurements taken by the sensors, the control means are connected to the actuators via a connection harness. Each actuator is fitted with a connector for receiving the harness.

The designers of braking systems or of actuators seek to make actuators that are made up of two portions that are separable: a first portion comprising the motor, the blocking member, and the sensors associated with the motor; and a second portion comprising the pusher and the sensors associated with the pusher. In the event of a failure of either one of the two portions, only the failed portion is removed, while the portion that is still operational is retained on the brake. Such a configuration presents a clear economic advantage when one of the two portions is significantly less reliable than the other.

Nevertheless, since each portion co-operates electrically with the control means, it is necessary to provide each portion with an electrical connector. A second connector is thus added to the actuator, thereby increasing its cost and making the management of interfaces and the connection harness more complex.

OBJECT OF THE INVENTION

An object of the invention is to provide an actuator made up of two separable portions, but not presenting the above-mentioned drawbacks.

SUMMARY OF THE INVENTION

In order to achieve this object, the invention provides an electromechanical actuator for a vehicle brake, the actuator comprising a first portion and a second portion that are separable, the first portion having an electric motor and connection means for connecting the actuator to external control means, and the second portion including a pusher mounted to slide so as to project from the second portion through an opening formed therein, the first portion and the second portion being coupled together so that the motor co-operates with the pusher to cause the pusher to move in response to drive from the motor, the second portion further including measurement means. According to the invention, first portion includes a first antenna connected to the connection means, and the second portion includes a second antenna connected to the measurement means, the two antennas being arranged so as to be electromagnetically coupled together when the first portion and the second portion are coupled together, so as to enable electrical signals to be transferred between the measurement means and the connection means.

The first and second antennas make it possible, when the first and second portions of the actuator are coupled together, to connect those portions together electrically. Thus, electrical signals can be transferred between the measurement means in the second portion and the external control means via the connection means without any wired connection between the first and second portions. The two portions are thus separable without any need to fit the second portion with connection means for connection with the external control means, thereby simplifying the actuator, the connection harness connecting the actuator to the external control means, and the management of the interfaces.

BRIEF DESCRIPTION OF THE DRAWING

The invention can be better understood in the light of the following description given with reference to the FIGURE of the accompanying drawing, which is a diagram showing an electromechanical actuator of the invention.

DETAILED DESCRIPTION OF THE INVENTION

An electromechanical actuator 1 of the invention is for selectively applying a braking force on friction members 2 of a brake of an aircraft wheel, specifically a stack of carbon disks. This actuator 1 is mounted on an actuator carrier 3 of the brake and it is fastened to the actuator carrier by fastener means that are not shown in the FIGURE.

The actuator 1 is controlled by external control means 4 that receive a braking setpoint, determining the braking force to be applied, and they generate electrical control power for controlling an electric motor 3 of the actuator 1 as a function of the braking force. The electric motor 5 then moves a pusher 6 facing the stack of disks 2 in order to apply the braking force to the stack of disks 2.

In order to transmit this electrical control power, the actuator 1 is connected to the control means 4 by a connection harness 7. The actuator carrier 3 optionally includes a connection unit connected to all of the actuators of the brake and connected by a single cable to the control means 4.

The actuator is made up of a first portion 8 and a second portion 9, which portions are separable.

The first portion 8 of the actuator 1 has connection means for connecting the actuator 1 to the control means 4, the electric motor 5, a blocking member 11, an angular position sensor 12 for sensing the angular position of a rotor of the engine, a sealing gasket 13, and a first antenna 14.

The connection means comprise an electrical connector 15 having the connection harness 7 connected thereto. The electric motor 5 is connected to the electrical connector 15 in order to receive the electrical control power and in order to be controlled by the control means 4.

The blocking member 11 and the position sensor 12 are also connected to the electrical connector 15 and they are connected to the control means 4.

The blocking member 11 is an electromagnetic device serving to block rotation of the motor.

The angular position sensor 12 delivers an accurate angular position for the rotor to the control means 4 so that the electrical control power transmitted to the electric motor 5 optimizes the torque delivered by the motor 5.

The electrical connector 15 and the connection harness 7 are also used for powering the blocking member 11 and for transmitting the angular position measurements of the rotor to the control means 4.

The second portion 9 of the actuator 1 comprises step-down gearing 17, a nut 18, a pusher 6, an anti-rotation device, measurement means 21, and a second antenna 22.

The pusher 6 is threaded over a certain length 23 in order to co-operate via a screw-and-nut connection with the nut 18. The pusher 6 also has a cylindrical main portion 24 of axis X carrying a shoe 25 at its end. The anti-rotation device in this example comprises a fluted central finger 26 co-operating with internal fluting of the pusher 6 preventing any rotation of the pusher 6 about the axis X.

In this example, the measurement means 21 comprise a force sensor 27 measuring force at the screw-and-nut connection, which force is representative of the braking force applied by the actuator 1. The measurement means 21 also include an electrical unit 28 connected to the force sensor 27 and to the second antenna 22.

When they are coupled together to form the actuator 1 of the invention, the first and second portions 8 and 9 co-operate in particular mechanically. The gearing 17 transmits the rotary movement of a shaft 29 of the motor 5 to the nut 18, which is rotatably mounted in the second portion and co-operates with the threaded length 23 of the pusher 6. The pusher 6 then slides longitudinally under drive from the electric motor 5 so as to project from the second portion 9 through an opening 30 formed therein. The first portion 8 and the second portion 9 are mechanically secured to each other by means that are not shown in the FIGURE. Their interface is sealed by the sealing gasket 13 of the first portion.

When they are coupled together, the first and second portions 8 and 9 of the actuator 1 also co-operate electrically: the antennas 14 and 22 are electromagnetically coupled to each other so as to enable electrical signals to be transferred between the measurement means 21 and the electrical connector 15. In this example, each of the antennas 14, 22 comprises an inductive element, specifically a circular coil of conductive wire. The two antennas are arranged substantially concentrically relative to each other when the first and second portions 8 and 9 of the actuator 1 are coupled together.

The first antenna 14 is connected via the electrical connector 15 and the connection harness 7 to the control means 4. The control means 4 are adapted to generate alternating current (AC) that, on flowing through the coil of the first antenna, emits an electromagnetic wave that is picked up by the coil of the second antenna 22. Electrical energy is thus transferred by electromagnetic waves to the measurement means 21 of the second portion 9, which means are electrically powered by this electrical energy: the measurement means 21 therefore do not require their own power supply.

The electrical unit 28 of the measurement means 21 is adapted to acquire the force measurements made by the force sensor 27 when it is powered, to digitize these force measurements, and to modify a voltage across the terminals of the coil of the second antenna 22. This voltage modulation has the effect of modulating the current flowing in the coil of the first antenna 14. The control means 4 are capable of interpreting this modulation and of acquiring in turn the force measurements made by the force sensor 27.

Because of the electromagnetic coupling between the two antennas 14, 22, it is thus possible to power the measurement means 21 situated in the second portion 9 of the actuator 1 from the control means 4 connected to the first portion 8 via the harness 7 and the electrical connector 15, and to transmit the measurements taken by the force sensor to the control means 4, without any need to add connection means to the second portion. Since this electromagnetic coupling is contactless coupling that does not require a wired connection, the two portions are separable without any need for disconnecting wires. It is thus possible to separate the two portions easily in the event of one of the two portions failing in order to replace the defective portion.

The invention is not limited to the above description, but on the contrary covers any variant coming within the ambit defined by the claims.

Although antennas are described as comprising circular coils, it is naturally possible to use antennas of different shapes and technologies (patch antenna, spiral coils etched on printed circuits, etc.).

Although the second portion of the actuator is fitted with a force sensor, it could equally well receive a temperature sensor, e.g. measuring temperature in the proximity of the contact surface between the shoe and the stack of carbon disks. Under such circumstances, this sensor should also be connected to the electrical unit in order to receives its electrical power supply from the control means and in order to send its measurements to the first portion.

Although the sensor and the electrical unit are described as being separate in the measurement means, they could naturally be incorporated in a single component.

Although it is assumed above that the control means are in charge of controlling the motor of the actuator, of controlling the blocking member, of powering the measurement means, and of recovering the data measured by the measurement means, it would naturally be possible to share some of those tasks among various pieces of equipment connected to the connection means of the first portion.

The invention claimed is:

1. An electromechanical actuator for a vehicle brake, the actuator comprising:
    a first portion (8) and a second portion (9) that are separable, the first portion (8) having an electric motor (5) and connection means (15) for connecting the actuator to external control means (4), and the second portion (9) including a pusher (6) mounted to slide so as to project from the second portion (9) through an opening (30) formed therein,
    the first portion (8) and the second portion (9) being coupled together so that the motor (5) co-operates with the pusher (6) to cause the pusher (6) to move in response to drive from the motor (5),
    the second portion (9) further including measurement means (21) for measuring an operating characteristic of the actuator;
    the first portion (8) including a first antenna (14) connected to the connection means (15), and
    the second portion (9) including a second antenna (22) connected to the measurement means (21),
    the first antenna and the second antenna (14, 22) being arranged so as to be electromagnetically coupled together when the first portion (8) and the second portion (9) are coupled together, so as to enable electrical signals to be transferred between the measurement means (21) and the connection means (15), and
    the first antenna and the second antenna being fixed one to the other when the first portion and the second portion are fixed to each other.

2. The electromechanical actuator according to claim 1, wherein the electrical signals comprise measurements taken by the measurement means (21) and transmitted by the measurement means (21).

3. The electromechanical actuator according to claim 2, wherein the electrical signals comprise a power supply for the measurement means (21).

4. The electromechanical actuator according to claim 1, wherein the antennas (14, 22) are arranged substantially concentrically relative to each other when the portions are coupled together.

5. The electromechanical actuator according to claim 2, wherein the antennas (14, 22) are arranged substantially concentrically relative to each other when the portions are coupled together.

6. The electromechanical actuator according to claim 3, wherein the antennas (14, 22) are arranged substantially concentrically relative to each other when the portions are coupled together.

\* \* \* \* \*